May 12, 1953 A. G. COOLEY ET AL 2,638,422

TELEFACSIMILE RECORDING AND DUPLICATING PAPER AND METHOD OF MAKING SAME

Original Filed March 24, 1942

AUSTIN G. COOLEY
HAROLD R. DALTON
INVENTORS

BY John J. Rogan
ATTORNEY

Patented May 12, 1953 2,638,422

UNITED STATES PATENT OFFICE 2,638,422

TELEFACSIMILE RECORDING AND DUPLICATING PAPER AND METHOD OF MAKING SAME

Austin G. Cooley, New York, N. Y., and Harold R. Dalton, Jenkintown, Pa., assignors to Timefax Corporation, New York, N. Y., a corporation of New York Original application March 24, 1942, Serial No. 435,944. Divided and this application February 10, 1951, Serial No. 210,298

8 Claims. (Cl. 117—36)

This invention relates to electrosensitive recording and duplicating blanks, and more especially to blanks which are responsive to stylus-applied electric signals to produce a visible record thereon.

In the case of message transmission by electro-facsimile techniques it is not always possible or advisible to repeat the facsimile transmission, and yet it may be necessary to use the single facsimile record as a master to control the production of a very large number of duplicate imprints. Since the facsimile blank must be electrosensitive, its transverse or thickness electric conductivity is of great importance, and therefore the blank must not only be capable of acting as a duplicating master, but its electro-sensitivity to stylus-applied electric signals must be carefully controlled and maintained, especially since the blank must have uniformity of electrosensitive response over its entire area.

We have found that in order to achieve this desire unformity of electroresponse, and at the same time to enable the blank to be used as a duplicating master, particularly when the duplication is by contact with a moistened hectograph or mimeograph pad, care must be exercised in the choice and relative location of the various layers or ingredients which constitute the blank.

Accordingly, it is one of the principal objects of this invention to provide an improved electrosensitive recording and duplicating blank, and one which exhibits substantially uniform response over its entire area to a given stylus-applied electric signal.

Figure 1:
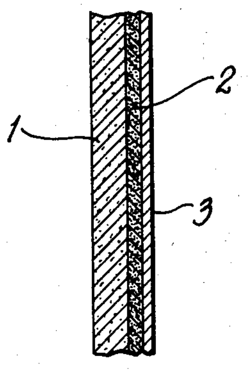
Fig. 1 is an enlarged cross-sectional view of part of an electrosensitive recording and duplicating blank according to the invention.

Referring to Fig. 1, the facsimile recording and duplicating blank according to the invention comprises a base or carrier 1 of paper, although other pliable materials such as fabric, photographic transparencies, or the like, may be employed. The paper 1 is provided with two superposed coatings or layers 2, 3. Coating 2 is especially designed so that in addition to having the desired electrical conductivity through its thickness, it also acts as a retainer for a dye or dyes which control the subsequent duplicating step. The layer 3 is a pigmented masking layer of extreme thinness, and acts as a protective or sealing coating for the duplicating coating 2. The coating 3, for convenience, is referred to herein as the facsimile or masking coating.

Figure 2:
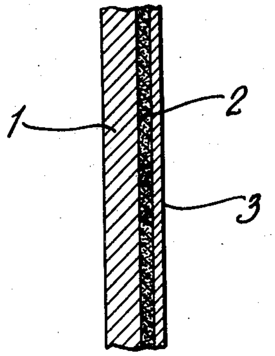
Fig. 2 is a modification of Fig. 1.

The blank can be used to receive and record electric signals such as facsimile or telegraph signals by well-known telefacsimile procedure. The blank is especially designed so as to be sensitive to stylus-applied electric signals. These electric signals can either be in the form of an electric space discharge to or through the coating 3, for example a corona discharge; or by means of current which is caused to flow conductively through the transverse cross-section of the blank. Where the recording is effected by an electric space discharge such as a corona discharge, as described in U. S. Patent #1,702,595 to Austin G. Cooley, the base 1 may be of non-conducting paper (Fig. 2). If the recording is effected by transverse conductivity through the entire blank including the base, the base 1 may be of electrically-conducting paper (Fig. 1). It will be understood, therefore, that the base paper 1 may be either non-conducting or substantially non-conducting, or it may be specially treated to render it of the desired conductivity in accordance with the particular type of electric current that is used for recording, that is whether a space discharge current or a transverse conductive current.

If the base 1 is of the non-conducting type, it may be a well-known white or colored paper upon which is applied a black conducting layer 2 containing electrically-conductive carbon such as gas black mixed with a dye or dye mixture and also with a suitable binder or adhesive. For convenience of description, the layer 2 containing the electrically-conductive carbon and the dye, will be referred to herein as the duplicating layer or coating. The layer or coating 3 which will be referred to herein as the facsimile coating, consists of a pigment, usually white, to contrast with the black coating 2, the said pigment being incorporated with a suitable adhesive or binder.

In accordance with the invention, the electrically-conducting coating 2 comprises, for example, gas black mixed with a water soluble binder such as gelatin, gum starch, casein, cellulose ether, or cellulose ester, and a suitable dye. Any suitable dye can be incorporated in the black coating 2, so long as the desired electric conductivity of the blank is not seriously impaired. Dyes like crystal violet, methyl violet, basic fuchsin, methyl green, water soluble nigrosine, chrysoidine brown, etc., or any combination of such dyes, can be used.

In using the binders above mentioned, it is desirable to use as little binder as possible, and in general the amount of binder may vary from 5% to 30% of the dry weight of the carbon or gas black.

The binder that is used for the coating 3, should be chosen so that there will be little, if any, tendency for the two coatings to intermingle when coating 3 is applied over coating 2. Also it is necessary to select the proper combination of binders and solvents for both coatings, so that the dye of coating 2 will be very soluble in its solvent, and will be well distributed when dry, but will not mingle with the facsimile coating 3 when the latter is applied. Since the coating 3 acts as a masking or protective coating for the dye-bearing coating 2, and since it is the coating 3 that is exposed during handling of the blanks, it is important that the binder that is used for coating 3, be water insoluble, otherwise the blank would be subject to water spotting and smearing, due to handling. In other words, the coating 2 should, in accordance with the invention, incorporate a water soluble binder, and the coating 3 should incorporate a water insoluble binder. The following is a typical example of a mixture that may be used for the coating 2:

*Example I*

5.0 grams of gas black (Dixie #5 manufactured by the United Carbon Company, Inc.)
2.0 grams Methocel (15 cps, manufactured by the Dow Chemical Company)
4.0 grams crystal violet
55.0 cc. water The Methocel is dissolved in a portion of the water and the gas black added while stirring. The dye is added to the remaining water and heated slightly to dissolve it completely. A small amount of glycerol, Carbitol or the like material may be added to increase the solubility of the dye. The mixture is then passed through a colloid mill or similar device and applied to the paper by any of the normal coating methods, such as spraying, dipping, brushing, or knife coating, etc. After coating the paper, the liquid contained in the binder is evaporated off by heating or any other suitable method. The paper may thereafter be subjected to calendering in order that the surface may be smooth.

The following is another example of a mixture that can be used for coating 2:

*Example II*

5.0 grams of gas black (Dixie #5 manufactured by the United Carbon Company, Inc.)
1.2 grams polyvinyl alcohol (R. H. 488 manufactured by the E. I. du Pont de Nemours & Co.)
1.1 grams crystal violet
1.0 gram methyl green
0.4 gram basic fuchsin
1.5 grams chrysoidine
55.0 cc. water In this instance a combination of dyes was selected to produce a black color. The polyvinyl alcohol is dissolved in a portion of the water and the gas black added. The dyes are dissolved in the remaining water by heating slightly and added to the black dispersion. Thereafter the mixture is passed through a colloid mill or similar device before application to the paper. The application may be by any of the methods suggested hereinabove, and of course, includes the steps of evaporating the liquid from the binder and of calendering if necessary.

For facsimile paper purposes the paper after coating with the first or conducting coating 2 is further processed with the second or facsimile coating 3. This latter coating consists of a white or light colored pigment and a binder. The binder utilized may be any one of those mentioned in connection with the conducting coating, but as has been stated it should be a binder soluble in organic solvents for the facsimile coating, and one soluble in water for the conducting coating. Amongst the pigments which are satisfactory for use in the facsimile coating may be mentioned zinc sulphide, zinc oxide, barium sulphate, barytes, blanc fixe, lithopone, titanium dioxide, and the like. The sensitivity of some of these pigments may be improved by incorporating in them a small percentage, approximately 0.2 to 1.0%, of either mercuric sulphide, red or yellow lead oxide, stannic sulphide, etc. Of course it must also be kept in mind to so select the solvent for the facsimile coating so that the ingredients from either coating will not mingle.

The amount of the facsimile coating necessary to produce a satisfactory recording paper is very small. The exact amount cannot be stated since variation in weight of the paper and variation in thickness of the black conducting coating will cause variations which make it difficult to measure. It may be said, however, that as little coating as possible should be applied; just sufficient to cover the black conducting coating uniformly and to give the finished surface a light gray appearance. It is desirable to apply the facsimile coating in such a manner as to retain the pigment on the surface of the black coating. In order that this may be accomplished, it is desirable that the coating be dried quite rapidly.

The following are examples of suitable mixtures for the facsimile coating 3:

*Example I*

60.0 grams zinc oxide
0.3 gram mercuric oxide
15.0 grams of lacquer base consisting of 10% B. R. 254 resin manufactured by the Bakelite Corporation, 75% Ethocel, 10 cps Standard; manufactured by the Dow Chemical Company and 15% of No. 6 Plasticizer manufactured by the Dow Chemical Co.
125.0 grams solvent consisting of 70% toluol and 30% ethyl acetate.

The lacquer base is dissolved in the solvent and the zinc oxide and mercuric oxide thereafter added. The mixture is then passed through a colloid mill or other similar device before application to the paper, which application may be by any of the methods herein mentioned.

*Example II*

This example is similar to the above except that cellulose nitrate is used as the cellulose derivative.

60.0 grams zinc oxide
0.3 gram mercuric oxide
18.0 grams of lacquer base consisting of 15% ester gum 125 manufactured by the American Cyanamid & Chemical Corporation, 70% nitro cellulose 2 second and 15% of No. 6 Plasticizer manufactured by the Dow Chemical Company.
140.0 grams solvent consisting of 70% toluol, 25% ethyl acetate and 5% denatured alcohol.

The lacquer base is dissolved in the solvent and the zinc oxide and mercuric oxide thereafter added. The mixture is prepared and applied by any of the methods herein mentioned.

Figure 3:
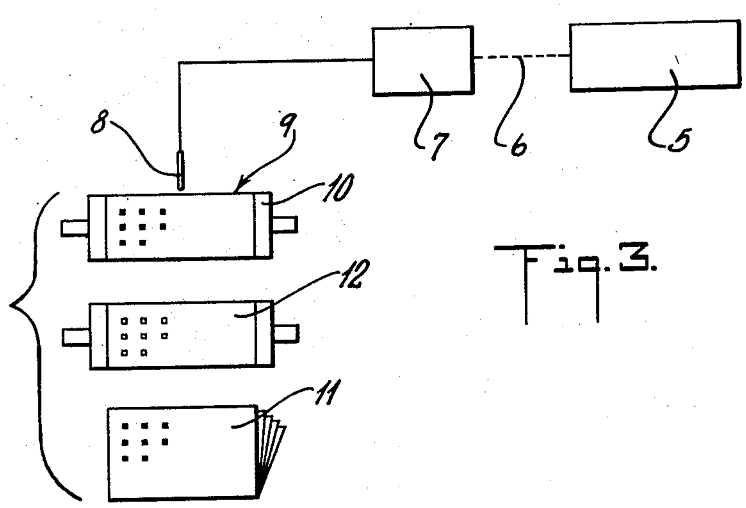
Fig. 3 is a diagrammatic view of a facsimile recording and duplicating system for using the blank according to the invention.

Referring to Fig. 3, there is shown in generalized schematic form, a telefacsimile recording and duplicating system wherein the numeral 5 represents any well-known form of telefacsimile transmitter whereby the subject matter to be transmitted is scanned in successive areas of elemental size to produce corresponding electric signals. These signals are transmitted over a suitable transmission channel 6 to the facsimile receiver 7, the output of which energizes the recording needle 8 with a corona producing voltage whose effective recording value is determined by the received telefacsimile signals. The needle 8 is slightly spaced from the recording blank 9 which is carried by the rotating drum 10. The drum 10 is rotated and advanced longitudinally in any manner well-known in the facsimile scanning arts and in synchronism with the corresponding scanning equipment at the transmitter 5. The recording blank 9 is formed of a base of paper having two superposed layers corresponding respectively to layers 2 and 3 of Fig. 1. As a result of the corona discharge from needle electrode 8, the outer or facsimile layer 3 is removed at the points corresponding to the original subject matter scanned at the transmitter 5 thus exposing the dye-carrying transfer layer 2. The subject matter is therefore directly produced on the blank 9 and this blank may be removed and its surface moistened by a suitable solvent for the dye in coating 2 but which solvent does not affect the coating 3. This moistened record blank can then be used as a matrix to transfer the recorded subject matter any desired number of times to any suitable receiving surface such as to a succession of paper sheets 11. The transfer of the moistened dye-record from blank 9 to the copy sheets 11 can be done either directly as described, or indirectly by "Ditto" or "Hectograph" process. Thus the dye record on blank 9 can be transferred by contact with a hectograph blank 12 comprising an aqueous solvent held by a moistened gelatin-glycerol compound which receives the impression in reverse from the master record and transfers it to the paper or sheet material in readable form by bringing the two in contact with each other. Water is used as the solvent for the copying machine process and alcohol solutions for the spirit process.

The copying facsimile paper of this invention can be used to produce copies either from aqueous or alcoholic solvent processes and by proper selection of the dye in coating 2 and binder base in coating 3 can be made to operate using other solvents if occasion arises.

The number of copies that can be obtained from a single facsimile recording used as a master record is also very large, larger than for any known master records using the described method of copying, and a distinct feature of this particular combination of paper and coatings. This results from the fact that the master record holds or can be made to hold large quantities of dye and the master record can be used over and over again to produce fresh impressions on the gelatin-glycerol compound. Over 1,000 clear legible copies have been made from a facsimile recording.

Various changes and modifications may be made in the disclosed embodiments without departing from the spirit and scope of the invention.

This application is a division of application Serial No. 435,944, filed March 24, 1942, now abandoned.

What is claimed is:

1. The method of making a recording and duplicating blank which is specially adapted to record electric signal voltages stylus-applied thereto, which comprises mixing transferable dye with electrically conductive carbon with a water soluble binder and with water, applying said mixture to the surface of a backing to form a duplicating coat of predetermined electric conductivity, drying the said mixture on said backing, mixing a pigment with a binder soluble in an organic solvent and with such organic solvent in which said dye and the first-mentioned binder are insoluble, applying the second-mentioned mixture over the first-mentioned mixture with a thinness merely sufficient to mask the color of said dye and of said carbon, and then drying said second mixture to form a non-tacky homogeneous and pigment-bonded masking coat over the first mixture which masking coat is locally removable in elemental areas in response to electric discharge produced by said stylus-applied electric signal voltages.

2. A blank specially adapted for making a duplicating and direct visual record of electric facsimile signals stylus-applied thereto, comprising a pliable backing having a dry top surface coat which is removable in minute areas sharply localized beneath the point of an electrically energized needle stylus, a dry duplicating coat sandwiched between said backing and said top coat, said duplicating coat having incorporated herein a predetermined quantity of electrically conductive carbon together with a binder and a transferable dye to constitute and maintain said duplicating coat an electrical conductor and the binder and dye being soluble in the same solvent, said top coat being non-tacky and forming a sealing and protective coat for the dye in said duplicating coat, said top coat containing a pigment bonded therein and being of a thinness sufficient to mask said dye and said electrically conducting carbon, the said dye and binder of the duplicating coat being insoluble in the solvent for said top coat.

3. A blank specially adapted for making a duplicating and direct visual record of electric facsimile signals stylus-applied thereto, comprising a pliable backing having a dry top surface coat which is removable in minute areas sharply localized beneath the point of an electrically energized needle stylus, a dry duplicating coat sandwiched between said backing and said top coat and having incorporated therein a predetermined quantity of electrically conductive carbon together with a water soluble binder and a water soluble transferable dye to constitute and maintain said duplicating coat an electrical conductor, said top coat being non-tacky and forming a sealing and protective coat for the dye in said duplicating coat, said top coat containing a pigment and a binder for the pigment and which binder is water insoluble and being of a thinness merely sufficient to mask said dye and said electrically conductive carbon.

4. A blank specially adapted for making a duplicating and direct visual record of electric facsimile signals stylus-applied thereto, comprising a pliable non-conducting paper backing having a dry top surface coat which is removable in minute areas sharply localized beneath the point of an electrically energized needle stylus, a dry duplicating coat sandwiched between said backing and said top coat and having incorporated therein a predetermined quantity of electrically conductive carbon together with a water soluble binder and a water soluble transferable dye to constitute and maintain said duplicating coat an electrical conductor, said top coat being non-tacky and including a masking pigment permanently bonded therein and a water insoluble binder therefor to form a sealing and protective coat for the dye in said duplicating coat, said top coat having a thinness merely sufficient to mask said dye and said electrically conductive carbon.

5. A blank specially adapted for making a duplicating and direct visual record of electric facsimile signals stylus-applied thereto, comprising a non-conductive paper backing having a dry top surface coat which is removable in minute areas sharply localized beneath the point of an electrically energized needle stylus, a dry duplicating coat sandwiched between said backing and said top coat and having incorporated therein a predetermined quantity of electrically conductive carbon together with a water soluble binder and a water soluble transferable dye to constitute and maintain said duplicating coat an electrical conductor, said top coat including a pigment and a water insoluble resin binder therefor and which is non-tacky when dry to form a sealing and protective coat for the dye in said duplicating coat, said top coat having a thinness merely sufficient to mask said dye and said electrically conductive carbon.

6. A blank specially adapted for making a duplicating and direct visual record of electric facsimile signals stylus-applied thereto, comprising a paper backing having a dry top surface coat which is removable in minute areas sharply localized beneath the point of an electrically energized needle stylus, a dry duplicating coat sandwiched between said backing and said top coat and having incorporated therein a predetermined quantity of electrically conductive carbon together with a water soluble polyvinyl alcohol binder and a water soluble transferable dye to constitute and maintain said duplicating coat an electrical conductor, said top coat including a whitish pigment together with a water insoluble resin binder therefor and which is non-tacky when dry to form a sealing and protective coat for the dye in said duplicating coat, said top coat having a thinness merely sufficient to mask said dyes and said electrically conductive carbon while being smoothly continuous and non-powdering.

7. A unitary multi-layer blank specially adapted for recording and duplicating electric signals stylus-applied thereto, said layers being integrally bonded to form a unitary composite single sheet which retains its single sheet character both during recording and duplication, said blank comprising a paper backing layer, a dry top facsimile layer which is removable in localized areas in response to electric signals stylus-applied thereto, said top layer comprising a pigment bonded in a water insoluble binder, a dry duplicating layer sandwiched between said backing layer and said top layer and comprising electrically conductive carbon with a water soluble binder and a water soluble transferable dye, said duplicating layer being an electrical conductor, said top layer being non-tacky and being integrally bonded to said duplicating layer and to said paper layer to form a single sheet both during recording and duplication, said top layer being of minimum thinness consistent with the desired masking of said dye and said electrically conductive carbon.

8. A blank according to claim 7, in which said top layer comprises a dried mixture of said pigment and a water insoluble resin binder.

AUSTIN G. COOLEY.
HAROLD R. DALTON.

References Cited in the file of this patent

UNITED STATES PATENTS

| Number | Name | Date |
| --- | --- | --- |
| 2,188,590 | Bjorksten | Jan. 30, 1940 |
| 2,294,150 | Kline | Aug. 25, 1942 |